Dec. 30, 1952 P. L. CAFFIER ET AL 2,623,584
ELECTRICAL INTERVAL TIMER
Filed Dec. 19, 1947

INVENTOR.
PIERRE L. CAFFIER
& MILTON ZUCKERMAN
BY Joseph B Forman
ATTORNEY

Patented Dec. 30, 1952

2,623,584

UNITED STATES PATENT OFFICE 2,623,584

ELECTRICAL INTERVAL TIMER

Pierre L. Caffier, Oradell, N. J., and Milton Zuckerman, Brooklyn, N. Y.

Application December 19, 1947, Serial No. 792,765

3 Claims. (Cl. 161—1)

The present invention relates to a timing device having particular utility in the field of automatically timed heating apparatus, as for example, electrical toasters. The invention is related to our co-pending patent application Serial No. 792,764 filed December 19, 1947, and entitled "Electrical Interval Timer," inasmuch as it uses for accuracy the "flash heating" principle of that application. Flash heating as referred to herein is intended to mean the heating of a bi-metallic element at a rate of time of approximately 1/30 of the cooling period. It possesses, however, additional features of definite advantage to bread toasting devices.

These features consists of an electrically operated compensator of dual purpose: It will adjust the toasting time dependent upon whether the toaster is used from a cold start or after it has reached a higher temperature due to the heat stored in the mass of the toaster. For example, it has been found the time required to toast the first slice of bread when the toaster starts at ambient temperature is about 33% greater than after the toaster element has reached a heated set of balanced conditions.

By means of this invention a toaster timing mechanism is provided which will compensate automatically for the difference in time required to toast bread to the same degree from a condition in which the toaster is used from a cold start to the condition when it has reached a relatively high temperature.

It has also been found that the time necessary to toast bread to a predetermined degree of toasting varies directly with the heat output of the heating element which is a function of the square of the line voltage delivered from the mains, said line voltage is known to vary from 90 to 130 volts. Hence, at 130 volts the time required for toasting is about one half that required at 90 volts.

A further object of the invention is to provide a toaster timing mechanism which will have variable action, in accordance with line voltage variations, the mechanism compensating for differences in applied heat which occur due to said voltage variations.

A further object of the invention is to provide a timing device of universal application and incorporating an electrical switching circuit which is broken automatically after a predetermined period, which period may be of short duration, and which will be useful for light control purpose, etc., which will be durable, efficient, and of very inexpensive construction. For all purposes the device is of such character that it can be recycled immediately upon completion of each operation.

The invention will be described with reference to the accompanying drawings, in which.

Figure 1:
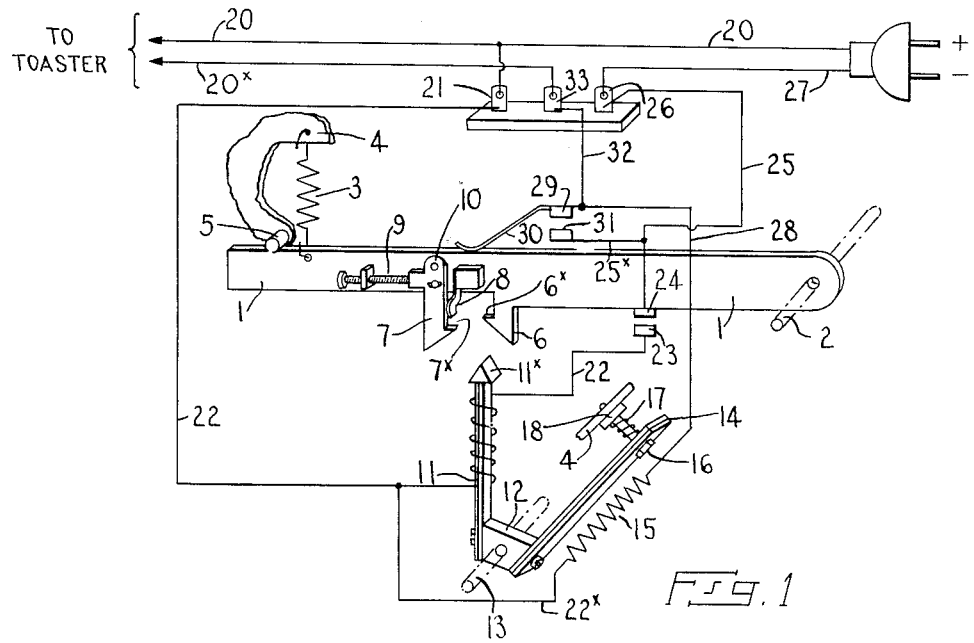
Figure 1 is a diagrammatic view showing an embodiment of the invention in conjunction with two electrical circuits.

Referring to the drawings the embodiment therein shown comprises a control arm 1 pivoted at 2 and having applied to its end opposite the pivot a spring 3 which at its top will be carried by a fixed wall 4 which may be a wall of the toaster casing. The extreme upper position of control arm 1 is determined by a stop pin 5.

Control arm 1 carries a relatively short bevelled tooth 6, having a shoulder at 6x, and the arm carries a second relatively long bevelled tooth 7, having a shoulder at 7x. It is preferred that tooth 7 be adjustable and to that end it may be engaged on one side by a light spring 8, opposed in its action by an adjusting screw 9, tooth member 7 being pivoted at 10.

Below control arm 1 is an upwardly directed bimetal element 11 having a wedge-shaped top 11x, the under surface of member 11x providing a horizontal shoulder for engagement with each of the shoulders 6x and 7x.

The bi-metal element 11 is carried by a block 12, pivoted at 13, which block carries a bi-metal shown at 14, and which bi-metal element has its high expanding side directed away from bi-metal element 11 and adjacent a heater resistor shown at 15.

The compensator at its upper end is apertured to receive a threaded stud 16, the latter carrying a spring 17, the tension of the spring being regulated through an adjusting inside threaded nut 18 secured to a base supporting the timer elements. It will thus be seen that a movement of the unit consisting of bi-metallic element 11 and compensator resistor 14, to the left of Figure 1, will be in opposition to spring 17.

Bi-metal unit 11 is provided with a heater resistor 19.

The circuits and circuit-breaking switch elements will now be described:

The current from the main is led through conductor 20 to the output, as for example a toaster, and it may be assumed that this is a positive conductor lead. Connected to conductor 20 is a junction element 21 from which is led a conductor 22 leading to heater resistor 19 and thence to contact 23 which lies below a contact 24 carried by control arm 1. Contact 24 is connected by conductor 25 with a junction element 26 for negative conductor 27 leading to the main. It will thus be seen that when the switch comprising contacts 23, 24, is closed, heater resistor 19 will be energized.

Positive conductor 22 is connected by branch 22x with the heating element 15 of compensator bi-metallic element 14, and heating element 15 also is connected to conductor 28 leading to contact 29 which is upwardly movable by control arm 1 through engagement by the latter with a lift finger 30 carried by the contact. It will be understood that the contact 29 normally will be spring pressed downwardly so as to engage a contact 31 connected by conductor 25x with conductor 25 and then to negative input conductor 27. Contact 29 is connected with junction element 33 and conductor 20x to provide a negative output conductor.

Figure 2:
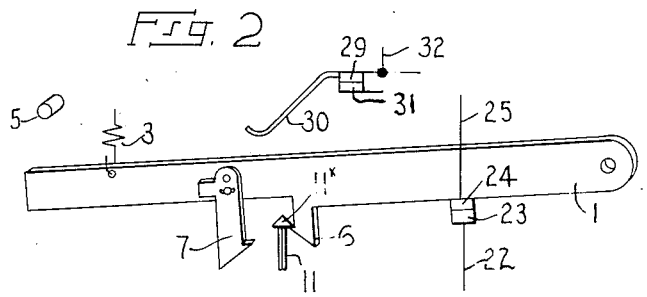
Figure 2 is a fragmentary view showing the control arm in a first position of action.

In the operation of the device it may be assumed that the position of the parts in Figure 1 are at ambient temperature of the bi-metal element 11, so that the shouldered head of the latter lies in registration with tooth 6 of control arm 1. When arm 1 is depressed to the position of Figure 2 the right-hand shoulder of head 11x will snap over the shoulder 6x of tooth 6, and arm 1 will be held downward with contacts 23 and 24 in engagement to close the circuit through the heater resistor 19. The latter will be adapted to impart a quick and high heat to the bi-metal element 11 and in a predetermined short time said element 11 will move to the position of Figure 3, its head snapping over upon shoulder 7x of the longer tooth 7 and this action will break the switch comprising contacts 23 and 24, de-energizing the heater resistor 19.

In the above last stated operation the output circuit will be unaffected, because contacts 29 and 31 will remain closed. Also, the heater 15, for the compensator resistor will remain in action.

Figure 3:
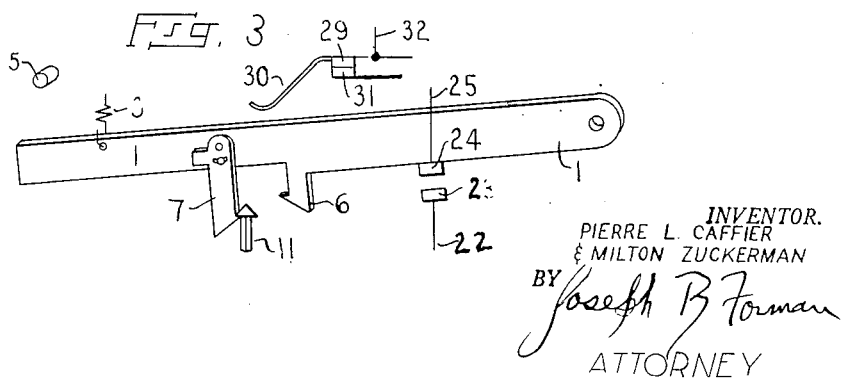
Figure 3 is a view similar to Figure 2 showing the control arm in a second position of action.

In the continued action of the device, with the control arm in the position of Figure 3, the bimetal element 11 will cool and finally will withdraw its head 11x from shoulder 7x, of tooth 7, and control arm 1 will be released, spring 3 moving it into the position Figure 1, and hence breaking the out-put circuit.

The pre-set toasting time, will vary in accordance with conditions in which the toaster is used from a cold start or after it has reached a higher temperature due to the heat stored in the mass of the toaster, because of the action of the compensator resistor, as now to be described.

As an operative example, the winding 19 on the bi-metallic element 11 may have a heating power sufficient to deflect sufficiently for release of tooth 6 in ten seconds. This time may be varied as desired by increasing or decreasing the number of turns of the resistance wire. However, the heater resistor 15 may have a heating power only sufficient to slowly move the combined units 11 and 14 on their pivot 13 in order to modulate the action of the bi-metallic element 11. The direction of the action of the resistor compensator 14 is to the right from the position thereof shown in Figure 1. Thus, when the device is thrown into action with the mass of the toaster casing cool, the compensator resistor, being heated slowly, will not ordinarily affect the position of bi-metallic element 14 in the first cycle. The accumulated heat, however, rises proportionately to the rising heat of the mass, and hence, in successive cycles of the toaster, the normal timing action of the bi-metallic element 11 is shortened. The same effect will be had with increased voltages because the combined units 11 and 14 will heat more rapidly.

Having thus described our invention, what we claim and desire to secure by Letters Patent, is as follows:

1. In an interval timer including an electrical timer circuit and an electrical output circuit, the combination of a control arm biased to a non-operating position, a first circuit breaker in series with said timer circuit and normally in open position, a second circuit breaker in series with said output circuit and normally in open position, a first latch element including a shoulder fixedly depending from said control arm and a second latch element including a shoulder depending from said control arm, said shoulders facing one another in offset position, and a bi-metallic element, a heater proximate said bi-metallic element and in electrical series circuit with said first circuit breaker, a latch head engaging element at one extremity of said bimetallic element, said other extremity being pivotally secured respective said control arm, means for positioning said control arm to place said first latch member shoulder in engagement with said latch head engaging element and close said first and second circuit breakers, said bi-metallic element upon being heated, moving said latch head engaging element out of engagement with said first latch element and into engagement with the shoulder of said second latch element, opening said first circuit breaker, and upon cooling of said bi-metallic element, moving said latch head engaging element out of engagement with the shoulder of said second latch element and opening said second circuit breaker.

2. In an interval timer including an electrical timer circuit and an electrical output circuit, the combination of a base, a control arm pivotally secured to said base and biased to a non operating position, a first circuit breaker in series with said timer circuit and normally in open position, a second circuit breaker in series with said output circuit and normally in open position, a first latch element, including a shoulder, fixedly depending from said control arm a second latch element, including a shoulder, depending from said control arm, said shoulders facing one another in offset position, means for positioning said shoulder of said second latch member relative said shoulder of said first latch member, and a bi-metallic element, a heater proximate said bi-metallic element and in electrical series circuit with said first circuit breaker, a latch head engaging element proximate one extremity of said bi-metallic element, said other extremity of said bi-metallic element being pivotally secured to said base, means for positioning said control arm in operating position, said control arm in operating position placing said first latch member shoulder in engagement with said latch head engaging element and closing said first and second circuit breakers, said bi-metallic element upon being heated, moving said latch head engaging element out of engagement with said first latch element shoulder and into engagement with the shoulder of said second latch member opening said first circuit breaker, and upon cooling of said bi-metallic element, moving said latch head engaging element out of engagement with the shoulder of said second latch element and opening said second circuit breaker.

3. In an interval timer including an electrical timer circuit and an electrical output circuit, the combination of a base, a control arm pivotally secured to said base and biased to a non operating position, a first circuit breaker in series with said timer circuit and normally in open position, a second circuit breaker in series with said output circuit and normally in open position, a first latch element including a shoulder, fixedly depending from said control arm, a second latch element, including a shoulder, depending from said control arm, said shoulders facing one another, means for positioning said shoulder of said second latch element relative said first latch element, a first bi-metallic element and a second bi-metallic element, a first heater proximate said first bi-metallic element and in series electrical circuit with said first circuit breaker, a second heater proximate said second bi-metallic element and in parallel with said output circuit, said first and second bi-metallic elements having one of their extremities secured to one another and pivotally secured to said base, said second bi-metallic element having the other extremity thereof biased away from said first bi-metallic element, said first bi-metallic element including a latch head engaging element proximate the free extremity thereof, means for positioning said control arm in operating condition, said control arm in operating position, placing said first latch element shoulder in engagement with said latch head engaging element and closing said first and second circuit breakers, said bi-metallic element upon being heated, moving said latch head engaging element out of engagement with said first latch element shoulder and into engagement with the shoulder of said second latch member and opening said first circuit breaker, and upon cooling of said bimetallic element, moving said latch head member out of engagement with the shoulder of said second latch element and opening said second circuit breaker.

PIERRE L. CAFFIER.
MILTON ZUCKERMAN.

REFERENCES CITED

The following references are of record in the file of this patent:

UNITED STATES PATENTS

| Number | Name | Date |
|---|---|---|
| 1,795,013 | Denman | Mar. 3, 1931 |
| 2,198,133 | Smith | Apr. 23, 1940 |
| 2,221,863 | Crane | Nov. 19, 1940 |
| 2,234,764 | Ireland | Mar. 11, 1941 |
| 2,250,997 | Miller | July 29, 1941 |
| 2,362,751 | Huck | Nov. 14, 1944 |
| 2,367,500 | Huck | Jan. 16, 1945 |
| 2,502,180 | Smulski | Mar. 28, 1950 |